(No Model.) 3 Sheets—Sheet 2.
B. C. BATCHELLER.
ELECTROPNEUMATIC CIRCUIT CLOSER.
No. 585,647. Patented July 6, 1897.
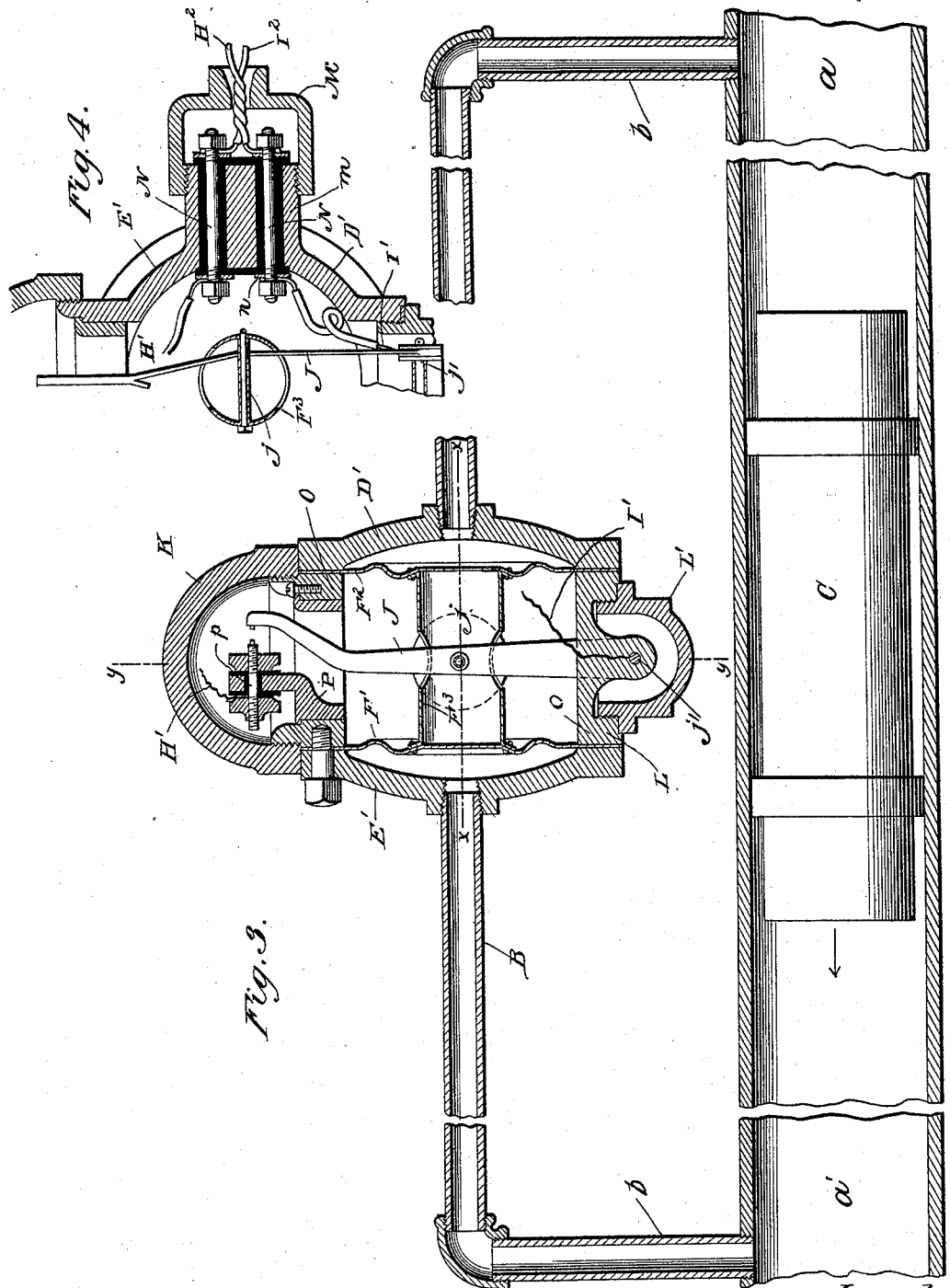
Witnesses.
Edw. S. Durell Jr.
A. W. Bayard.
Inventor.
Birney C. Batcheller
per Fred'k Päcker,
Atty.

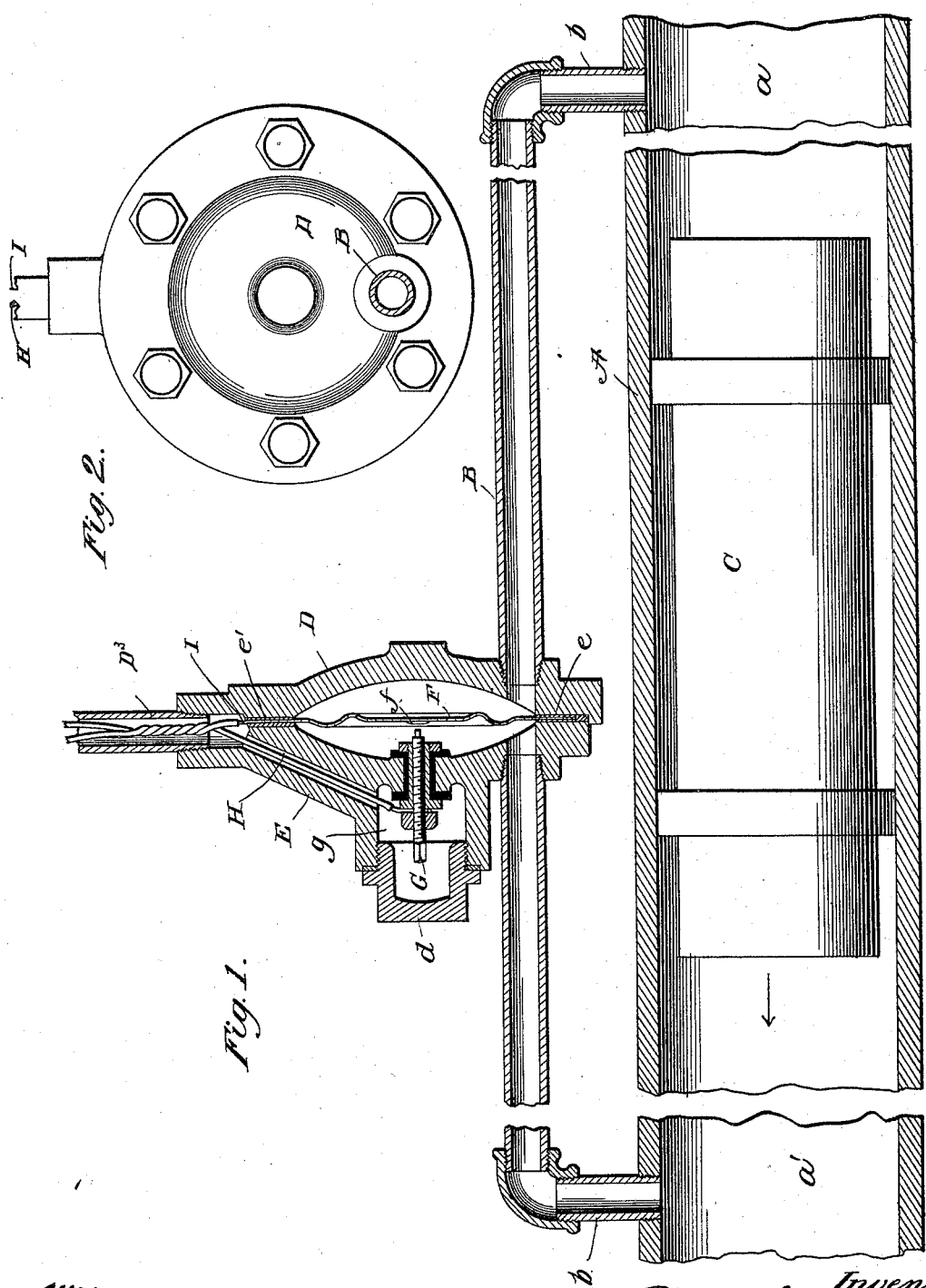

(No Model.) 3 Sheets—Sheet 3.

B. C. BATCHELLER.
ELECTROPNEUMATIC CIRCUIT CLOSER.

No. 585,647. Patented July 6, 1897.

Witnesses.
Edw. D. Duzell Jr
A. W. Bayard.

Inventor.
Birney C. Batcheller
per Fred'k C. Acker,
Atty.

UNITED STATES PATENT OFFICE.

BIRNEY C. BATCHELLER, OF BROOKLYN, NEW YORK.

ELECTROPNEUMATIC CIRCUIT-CLOSER.

SPECIFICATION forming part of Letters Patent No. 585,647, dated July 6, 1897.

Application filed April 6, 1896. Serial No. 586,359. (No model.)

*To all whom it may concern:*

Be it known that I, BIRNEY C. BATCHELLER, a citizen of the United States, residing at Brooklyn, in the county of Kings and State of New York, have invented certain new and useful Improvements in Electropneumatic Circuit-Closers; and I do hereby declare the following to be a full, clear, and exact description of the invention, such as will enable others skilled in the art to which it appertains to make and use the same.

This invention refers to the general class of pneumatic despatch or transmitting apparatus employing a column of air which fills a conduit wherein a carrier or series of carriers are propelled by the air-pressure as a motive force, and the present improvements relate particularly to an electropneumatic circuit-closing device operated by variations of pressure which take place in the air column incident to the passage of the carrier, the object of the invention being to provide means whereby the movement of the carrier past any fixed point or station may result in momentarily (or for an appreciable length of time, depending as to duration upon conditions to be specified) closing an electric circuit for any purpose for which such circuit-closing might be required.

Many useful purposes to which this invention may be put might be enumerated here if thought necessary, as the invention is adapted to a wide variety of applications.

The invention is especially designed for the closing of an electric circuit which locks the sending apparatus at the next station on the line of a pneumatic-despatch system, as shown in my copending application for a patent on a sending apparatus for pneumatic-despatch systems filed June 23, 1896, Serial No. 596,621.

The present invention may be used to indicate at some distant place that a carrier has passed a given point. This would be of use in determining the velocity of carriers in the tube or in showing when it is safe or dangerous to insert a second carrier into the system.

Hence the invention consists, essentially, in the construction, arrangement, and combination of parts, substantially as will be hereinafter described and claimed.

Figure 5:
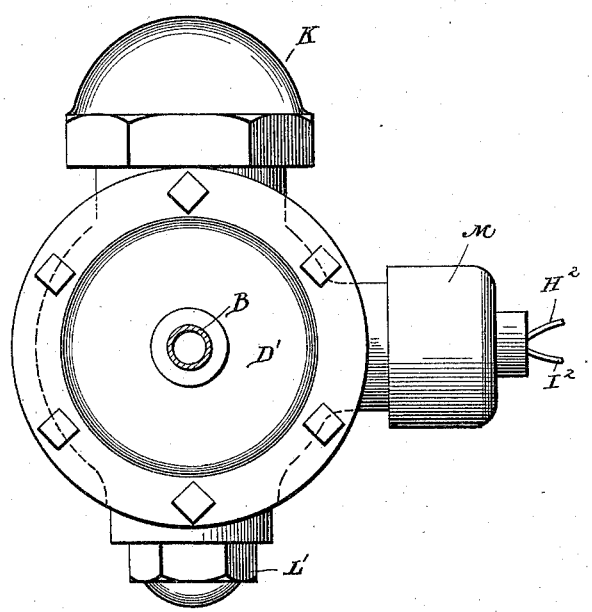
Figure 6:
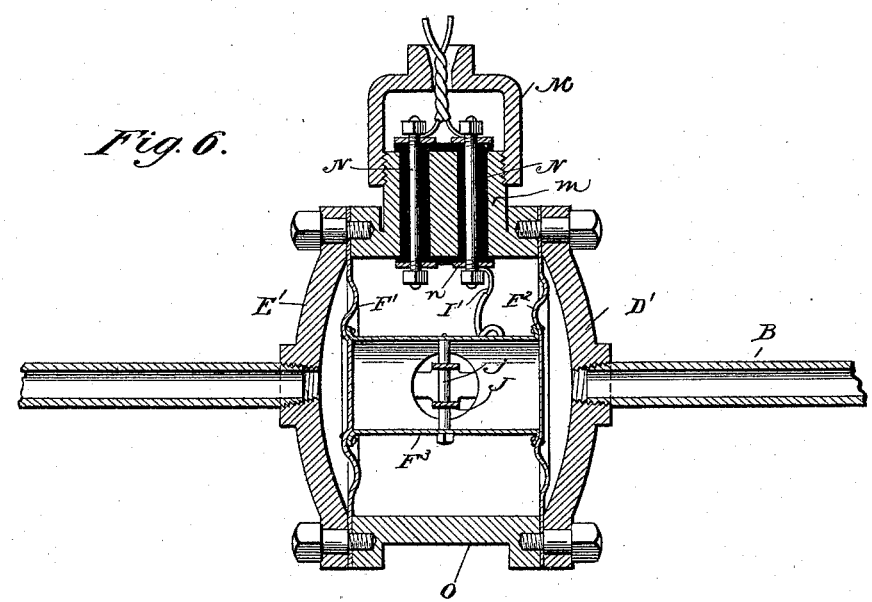

In the annexed drawings, illustrating my invention, Figure 1 is a longitudinal sectional view of a portion of a pneumatic despatch or transit tube equipped with my improved electropneumatic circuit-closing device which is operated by the variations of pressure incident to the passage of a carrier through the tube. Fig. 2 is a side elevation of the diaphragm-supporting chamber which forms a part of my invention. Fig. 3 is a longitudinal sectional view of a pneumatic-despatch tube similar to that shown in Fig. 1, representing likewise in section a modified form of my invention with which said despatch-tube is equipped. Fig. 4 is a partial vertical sectional view on the line $y\ y$ of Fig. 3. Fig. 5 is a side elevation of a diaphragm-supporting chamber belonging to the modification of my invention represented in Fig. 3. Fig. 6 is a horizontal section on the line $x\ x$ of Fig. 3.

Similar letters of reference designate corresponding parts throughout the different figures of the drawings.

A designates a pneumatic despatch or transit tube such as is ordinarily used for pneumatic transmission for the sending of articles, packages, mail-matter, or anything else which it may be desired to propel swiftly from one point to another. Said tube A is filled with a column of air having a certain pressure, and within the tube A moves a carrier C or a number of such carriers, the same being of any common and approved construction. Suppose the carrier C to be moving in the direction shown by the arrows in Figs. 1 and 3. Obviously then the air-pressure at $a$, which is a point at the rear of the carrier where the pressure of the air is a driving or propelling pressure, must necessarily be greater than the air-pressure at $a'$, which is a point in advance of the carrier and of course is less than the pressure at the rear end of same, for otherwise the carrier could not move through the tube. I call attention therefore to the well-known fact that the carrier within the pneumatic tube is not balanced between opposing pressures of equal strength, but when operative must need have a greater degree of pressure at its rear than at its forward end. In utilizing these obvious facts for the purpose of causing the variation in the pressures at the points $a$ and $a'$ to do the work of operating the electropneumatic circuit-closer constituting my present invention I tap the main line A at two points a convenient distance apart and insert therein two pipe-couplings, as $b\ b$, which I connect together by the pipe B. (See Figs. 1 and 3.) Couplings $b\ b$ may be any desired distance apart, depending upon the length of time it is desired to keep the electric circuit automatically closed. When the carrier C in its swift passage through the pneumatic tube A occupies a position between the two couplings $b\ b$, it will be evident that one of the couplings will receive from the main tube a fluid-pressure of the degree which exists at the point $a$, while the other coupling $b$ will receive a pressure of the degree which exists at the point $a'$. When the carrier is not between the couplings $b\ b$, the pressure in both of them will be equal to each other, or very nearly so.

The auxiliary pipe B consists of two sections, between which is interposed a diaphragm-supporting chamber or receptacle of suitable size and form and constructed in any desired manner, it being adapted to permit the entrance thereinto of the fluid-pressure within the sections of the auxiliary tube B, so that said pressure coming as it does from the two couplings $b\ b$, which connect with two separate parts of the main tube A, may enter the interposed diaphragm-supporting chamber on opposite sides of the diaphragm, in the manner and for the purpose to be presently more fully explained. This chamber comprises, essentially, the two disks D and E, fastened together by means of bolts or other devices, and between these plates is clamped a thin metallic diaphragm F, which divides the interior space between the two disks D and E into two sections, said diaphragm being insulated at the points where it rests between the plates D and E by means of insulating material at $e$ and $e'$.

One part of the pipe B enters the wall of disk D on one side of diaphragm F, while the other part of pipe B enters the wall of disk E on the opposite side of diaphragm F. Diaphragm F is provided with a central platinum or other point $f$. Opposite to this platinum center $f$ is an insulated adjustable screw G, capable of adjustment toward or from the diaphragm F and supported in the wall of the disk E. The squared end of screw G is located in a recess $g$, hollowed out in the disk E, which recess is closed by a removable screw plug or cap $d$. When it is desired to adjust screw G, so as to bring its point or tip nearer or farther away from the diaphragm F, the screw-cap $d$ can be removed, a wrench applied to the squared head of screw G, and the desired adjustment effected. An electric wire or conductor H runs through a passage in the wall of disk E and is attached to the screw G. Another electric wire I is connected to the diaphragm F. The outrunning portions of these wires H and I are of course insulated by being covered with some suitable material, and these insulated parts pass off through a tubular connection $D^3$, which is preferably screwed into the disks D E. Thus the wires H I may lead off to any desired point where the circuit may be needed for use. It will be obvious that if an increase of pressure against the diaphragm F brings the platinum center $f$ into contact with the screw G the electric circuit will be closed, and when the excess of pressure is reduced and the normal position restored by an equalization of the pressures on opposite sides of the diaphragm F the circuit will again be automatically broken.

In the alternative or modified form of mechanism for carrying my invention into practical effect, as shown in Figs. 3, 4, 5, and 6, the general combination of parts obtains, although the construction is somewhat different, yet with the accomplishment of a like result. The form of the chamber which is interposed in the length of the auxiliary pipe B, and also the form of the diaphragm, differs materially as to structural details from what is exhibited in Figs. 1 and 2. In Figs. 3, 4, 5, and 6 the diaphragm-containing chamber is made in the following manner: Two disks $D'$ and $E'$, which are similar in their general shape to the disks D and E of Fig. 1 and which are entered, respectively, by the sections of the pipe B, are secured by means of bolts or other suitable devices to a horizontal cylindrical casting O, on one side of which is a horizontal projecting boss or extension $m$, the end of which is externally screw-threaded for engagement with a screw-cap M. In the boss $m$ are situated a couple of insulated bolts or rods N N, the ends of which project into the interior of the cylindrical casting O and also into the interior of the screw-cap M, both ends of these bolts being provided with suitable nuts and adapted for the attachment thereto of electric wires, as shown. The diaphragm employed in this form of my invention is a double one and consists of the two diaphragm-plates $F'$ and $F^2$, each of which is similar to the diaphragm F of Fig. 1, these two plates $F'$ and $F^2$ being clamped tightly between the disks $E'$ and $D'$ and the adjacent edges of the cylindrical casting O, respectively, as is clearly shown in Fig. 6.

The two diaphragm-plates $F'$ and $F^2$ are connected together by the tubular metal connection $F^3$, which is suitably slotted for the passage vertically therethrough of a lever J, which is pivoted to the diaphragm connection $F^3$ by means of the pivoted pin $j$. The lever J is itself pivoted at one end to the wall of the cylindrical casting O, and a screw-cap $L'$ is screwed into the part L at a point surrounding the pivotal point $j'$ of lever J. Opposite to the pivot $j'$ of lever J the wall of cylinder O is provided with an opening in which is situated a collar P, that carries as a support an insulated screw $p$. The free end of lever J is adapted to oscillate relatively to the end of the screw $p$. A drum-shaped cap K screws over the screw-carrying part P by engaging a screw-threaded flange on the side of the cylinder O, and this protects the screw and the movable end of the lever. An electric wire I' connects with the pivot j' of lever J and also with one of the insulated bolts N. Another electric wire H' connects with the screw p and with the other bolt N. Wires I² and H² connect, respectively, with the opposite ends of the bolts to which the wires I' and H' are connected, and these wires I² and H² lead off from the circuit-closing mechanism to any point where it may be desired to apply the circuit-closer for use.

It will be evident that the air-pressure in one end of the auxiliary pipe B will enter through the disk D' and act against the diaphragm-plate F², while the air-pressure in the other end of the pipe B will pass through the disk E' and act against the diaphragm-plate F'. If one of these pressures is in excess of the other, the double diaphragm will move sufficienty to oscillate the lever J and bring the end of said lever into contact with the screw p, and thus close the circuit. When the equilibrium of pressure is reëstablished, the circuit will be broken again.

The operation of my invention, whether the mechanism be of the form illustrated in Figs. 1 and 2 or that of the form illustrated in Figs. 3, 4, 5, and 6, is substantially the same and will be easily understood. When the carrier C moves in the direction shown by the arrow and passes the pipe-coupling b at the right, the excess of pressure at a will immediately be transmitted to the diaphragm F or the diaphragm-plate F², as the case may be, and the result will be a shifting of the diaphragm or diaphragm-plate and a closing of the circuit. The circuit will remain closed until after the carrier has passed the next pipe-coupling b at the left, because until it does so pass the pressure at a' will be less than the pressure at a and the pressure on one side of the diaphragm less than that on the other. When the carrier does pass the coupling b at the left, the result will be to cause the pressure at a' to be equal to the pressure at a, and hence the pressure in both ends of the auxiliary pipe B to be equal, which will cause the pressure on opposite sides of the diaphragm to be equal, and the result will be that the circuit will be broken.

My invention may be put to a great variety of uses, which it is unnecessary to enumerate here. The exact and precise construction and arrangement of the various mechanical parts may be changed within wide limits without departing from the spirit of the invention, and I reserve the liberty of so varying the mechanical features as will make the invention best adapted for actual service.

Having thus described my invention, what I claim as new, and desire to secure by Letters Patent, is—

1. A circuit-closer, consisting in the combination with a pneumatic tube and a carrier therein, of a circuit-closing device operated by the differential pressure incident to the passing of the carrier.

2. A circuit-closer, consisting in the combination of a pneumatic-transit tube, a carrier within the same, a diaphragm subjected on opposite sides to the air or fluid pressure, means whereby said diaphragm closes the circuit by a difference of pressures at the ends of a carrier when said carrier passes.

3. A circuit-closer, consisting in the combination with a pneumatic-despatch tube, of an auxiliary tube, a chamber interposed in said auxiliary tube, a diaphragm in said chamber subjected on opposite sides to the pressure of air in the main tube, means whereby the fluctuations of said diaphragm will close and open the circuit, all arranged to operate by the differential pressure resulting from the passage of a carrier.

4. The combination of a pneumatic-despatch tube, a carrier moving within the same, an auxiliary pipe connected to the main tube at certain points, an interposed chamber in the length of said auxiliary pipe, a diaphragm supported in said chamber and subjected on opposite sides to the air-pressure within the main tube, electric wires, means whereby the movement of the diaphragm will close the circuit through said wires, substantially as described.

5. The combination with a pneumatic despatch or transit tube, a carrier within it, an incident of whose movement is a differential pressure at opposite ends of the carrier, and a circuit-closing diaphragm subjected to said differential pressure, substantially as described.

In testimony whereof I affix my signature in presence of two witnesses.

BIRNEY C. BATCHELLER.

Witnesses:
 HENRY B. HATHAWAY,
 GEORGE BRIDGE.